United States Patent
K et al.

(10) Patent No.: US 12,326,890 B2
(45) Date of Patent: Jun. 10, 2025

(54) MACHINE LEARNING FOR MULTI-CHANNEL INTERACTION WORKFLOWS

(71) Applicant: SAP SE, Walldorf (DE)

(72) Inventors: Prajesh K, Mattanur (IN); Somanathan Ramanathan, Bangalore (IN); Prateek Bajaj, New Delhi (IN)

(73) Assignee: SAP SE, Walldorf (DE)

( * ) Notice: Subject to any disclaimer, the term of this patent is extended or adjusted under 35 U.S.C. 154(b) by 423 days.

(21) Appl. No.: 17/529,706

(22) Filed: Nov. 18, 2021

(65) Prior Publication Data
US 2023/0153340 A1 May 18, 2023

(51) Int. Cl.
G06F 16/34 (2025.01)
G06F 16/2452 (2019.01)

(52) U.S. Cl.
CPC ...... *G06F 16/345* (2019.01); *G06F 16/24522* (2019.01)

(58) Field of Classification Search
None
See application file for complete search history.

(56) References Cited

U.S. PATENT DOCUMENTS

| | | | |
|---|---|---|---|
| 10,979,377 B1* | 4/2021 | Gupta | H04L 51/216 |
| 2020/0142959 A1* | 5/2020 | Mallinar | G06N 20/20 |
| 2020/0167420 A1* | 5/2020 | Yin | G06F 40/30 |
| 2020/0273453 A1* | 8/2020 | Mody | G06Q 10/109 |
| 2020/0320116 A1* | 10/2020 | Wu | H04L 51/10 |
| 2021/0264112 A1* | 8/2021 | Golding | G06F 40/35 |

* cited by examiner

*Primary Examiner* — Pierre Louis Desir
*Assistant Examiner* — Keisha Y. Castillo-Torres
(74) *Attorney, Agent, or Firm* — SCHWEGMAN LUNDBERG & WOESSNER, P.A.

(57) ABSTRACT

Interactions between organizations occur through multiple channels such as textual communication (e.g., emails) and voice communication (e.g., telephone conversations). All such interaction data collated together constitutes a large amount of unstructured data. A framework is provided for collating the unstructured interaction data and creating a machine-legible structure from it using machine learning models. The machine learning models may generate a variety of generic as well as business-context-relevant insights, with the usage and application of custom-built machine learning model pipelines that generate an overall business insight record that can then be published back into a customer relationship management (CRM) system. Multiple data types are used for the interactions. For example, a voice call may be recorded and stored as an audio file, whereas an email may be stored as a text file. Multiple such formats may also be used to store interaction data.

20 Claims, 10 Drawing Sheets

MACHINE LEARNING FOR MULTI-CHANNEL INTERACTION WORKFLOWS

TECHNICAL FIELD

The subject matter disclosed herein generally relates to evaluation of one or more interaction workflows. Specifically, the present disclosure addresses systems and methods for generating context-relevant intelligent insights using machine learning for multi-channel interaction workflows.

BACKGROUND

Business interaction scenarios in the context of front-office application capabilities provide multiple channels of communication between the users of such applications and the providers of the applications. These channels of communication include multiple media such as textual communication (e.g., chats, emails, notes, and knowledge base) and voice communication (e.g., telephonic conversations and audio messages).

DETAILED DESCRIPTION

Figure 1:
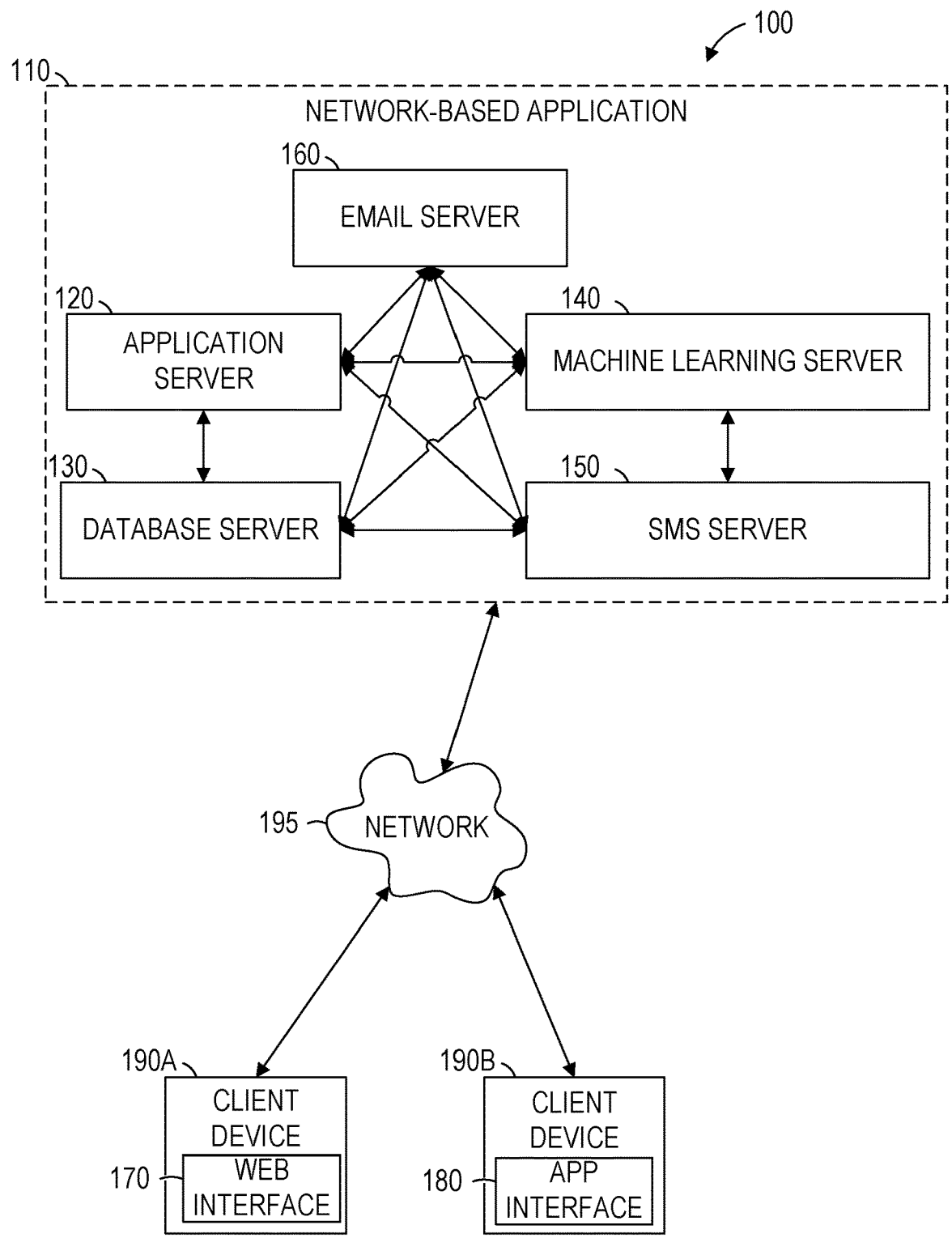
FIG. 1 is a network diagram illustrating an example network environment suitable for machine learning for multi-channel interaction workflows.

Example methods and systems are directed to machine learning for multi-channel interaction workflows. Business interaction scenarios in the context of front-office application capabilities provide multiple channels of communication between individuals. One or more of the individuals may be representatives (e.g., employees or officers) of a first organization or a second organization. An organization is an organized group of people with a particular purpose. Example organizations include businesses, governments, business units, non-profit organizations, and non-governmental organizations (NGOs).

The channels of communication include multiple media such as textual communication (in the form of chats, emails, notes, knowledge base), voice communication (including telephonic conversations, audio messages), and the like. Frequently, when two organizations interact, one organization is providing (or seeks to provide) a product or service to the other organization. A person that is interacting on behalf of the organization that provides the product or service is referred to as an agent. A person that is interacting on behalf of the organization that receives the product or service is referred to as a customer. Each service provider for such communication channels may provide a built-in capability of some "intelligence" that can be derived out of each interaction between an agent and a customer, which can be used in the application context.

For each interaction, there is a possibility of a wide array of workflows that can be carried out, including resolving a service ticket, creating a new sales lead, and the like. Each such workflow may include a large number of interactions between an agent and a customer. All such interaction data collated together constitutes a large amount of unstructured data.

As discussed herein, a framework is provided for collating the unstructured interaction data and creating a machine-legible structure from the collated interaction data using machine learning models. The machine learning models may generate a variety of generic as well as business-context relevant insights, with the usage and application of custom-built machine learning model pipelines that generate an overall business insight record that can then be published back into a customer relationship management (CRM) system.

Multiple data types may be used for interactions between agents and customers. For example, a voice call may be recorded and stored as an audio file, whereas an email may be stored as a text file. Multiple such formats may also be used to store interaction data. All interactions for a particular organization are collated. A standard machine-legible format is created based on the unstructured data. The standard machine-legible format may be used to convert the unstructured data into structured formats using machine learning algorithms.

A machine learning pipeline derives intelligent business-context-specific and relevant insights from the structured machine-legible data. The following is a non-exhaustive list of machine learning models that may be applied to the structured machine-legible data. Results from the machine learning models may be inserted into the structured machine-legible data.

A Textual Data Summarization machine learning model provides a crisp, concise, and legible summary of the input text. Data for each interaction is fed separately into the model to generate descriptive summaries of each of the interactions.

A Sentiment Detection machine learning model is applied to the structured data to detect the overall sentiment of a series of interactions. This is beneficial in helping the agent empathize with the customer based on the feel of how the series of interactions is progressing.

A Topic Detection machine learning model helps detect certain word clouds and relevant topics. A Business Entity Detection machine learning model may detect product identifiers, order identifiers, serial identifiers, or any suitable combination thereof. A Language Detection and Machine Translation machine learning model detects the language of the textual input, translates the input to another language, or both.

Using one or more of the above machine learning models, a business interaction insight record is generated. The business interaction insight record may be linked to data objects associated with the customer.

By comparison with existing methods of processing interaction data, the methods and systems discussed herein improve functionality by collating interactions made using multiple communication channels. When these effects are considered in aggregate, one or more of the methodologies described herein may obviate a need for certain efforts or resources that otherwise would be involved in reviewing and analyzing interactions. Computing resources used by one or more machines, databases, or networks may similarly be reduced. Examples of such computing resources include processor cycles, network traffic, memory usage, data storage capacity, power consumption, and cooling capacity.

FIG. 1 is a network diagram illustrating an example network environment 100 suitable for machine learning for multi-channel interaction workflows. The network environment 100 includes a network-based application 110, client devices 190A and 190B, and a network 195. The network-based application 110 is provided by an application server 120 in communication with a database server 130, a machine learning server 140, a short messaging system (SMS) server 150, and an email server 160. The application server 120 accesses application data (e.g., application data stored by the database server 130) to provide one or more applications to the client devices 190A and 190B via a web interface 170 or an application interface 180.

The application server 120, the database server 130, the machine learning server 140, the SMS server 150, the email server 160, and the client devices 190A and 190B may each be implemented in a computer system, in whole or in part, as described below with respect to FIG. 10. The client devices 190A and 190B may be referred to collectively as client devices 190 or generically as a client device 190.

The machine learning server 140 accesses training data from the database server 130. Using the training data, the machine learning server 140 trains a machine learning model that is used to generate embedding vectors for interactions (e.g., a vector for each email of the email server 160, a vector for each SMS of the SMS server 150, and vectors for other interactions). The Python library MUSE: Multilingual Unsupervised and Supervised Embeddings may be used to generate the embeddings, to create an alignment between monolingual embeddings using bilingual dictionaries, or both. In some example embodiments, different monolingual embeddings are used for different languages (e.g., one embedding for English and a different embedding for German).

As used herein, "embedding" refers to the conversion of human-readable words (in a natural language or a programming language) into multidimensional vectors suitable for computer processing. The vectors may be of one hundred dimensions or more, and thus are not suitable for manual calculation. Training of the language embeddings may be supervised or unsupervised. Supervised training takes labeled data as input. Unsupervised training learns from unlabeled data.

Multiple machine learning models may be trained by the machine learning server 140 to perform different functions. For example, a machine learning model may be trained to receive text for a set of interactions between two entities and generate output that indicates which interactions originate with each of multiple individuals. As another example, a machine learning model may be trained to receive text for one or more interactions and generate output that summarizes the received text. As still another example, a machine learning model may be trained to receive one or more embedding vectors as input and to generate a numerical value that indicates a sentiment of the interactions represented by the embedding vectors. As yet another example, a machine learning model may be trained to receive one or more data structures as input, each data structure comprising a summary of an interaction and a sentiment for the interaction; the machine learning model may generate a numeric or vector value as an output, the output value indicating a recommended action for one of the entities involved in the interactions.

An expert system or machine learning model may receive text or embedding vectors corresponding to the text as input and generate a numeric value as output, the numeric value indicating whether the input text identifies an entity (e.g., a company name, a product name, a person's name, or any suitable combination thereof). The output value may further indicate the identified entity (e.g., by providing a value for use as an index in a lookup table containing data regarding the entities).

The email server 160 provides email functionality to the client devices 190 to send email messages. A user interface is displayed on a client device 190 (e.g., via the web interface 170 or the app interface 180) that allows the user to provide text for an email message and send the message to one or more email addresses. The email server 160 routes the email message through the network 195 to a destination device identified by the email addresses. The email server 160 may also retain a copy of the email message; provide a copy of the email message to one or more of the application server 120, the database server 130, and the machine learning server 140; or any suitable combination thereof. The machine learning server 140 may access the email messages to generate intelligent business-context-specific and relevant insights from the email messages.

The SMS server 150 provides SMS functionality to the client devices 190 to send email messages. A user interface is displayed on a client device 190 (e.g., via the web interface 170 or the app interface 180) that allows the user to provide text for an SMS message and send the message to one or more SMS addresses (e.g., phone numbers, email addresses, or both). The SMS server 150 routes the SMS message through the network 195 to a destination device identified by the SMS addresses. The SMS server 150 may also retain a copy of the SMS message; provide a copy of the SMS message to one or more of the application server 120, the database server 130, and the machine learning server 140; or any suitable combination thereof. The machine learning server 140 may access the SMS messages to generate intelligent business-context-specific and relevant insights from the SMS messages.

Any of the machines, databases, or devices shown in FIG. 1 may be implemented in a general-purpose computer modified (e.g., configured or programmed) by software to be a special-purpose computer to perform the functions described herein for that machine, database, or device. For example, a computer system able to implement any one or more of the methodologies described herein is discussed below with respect to FIG. 10. As used herein, a "database" is a data storage resource and may store data structured as a text file, a table, a spreadsheet, a relational database (e.g., an object-relational database), a triple store, a hierarchical data store, a document-oriented NoSQL database, a file store, or any suitable combination thereof. The database may be an in-memory database. Moreover, any two or more of the machines, databases, or devices illustrated in FIG. 1 may be combined into a single machine, database, or device, and the functions described herein for any single machine, database, or device may be subdivided among multiple machines, databases, or devices.

The application server 120, the database server 130, the machine learning server 140, the email server 150, the SMS server 160, and the client devices 190A-190B are connected by the network 195. The network 195 may be any network that enables communication between or among machines, databases, and devices. Accordingly, the network 195 may be a wired network, a wireless network (e.g., a mobile or cellular network), or any suitable combination thereof. The network 195 may include one or more portions that constitute a private network, a public network (e.g., the Internet), or any suitable combination thereof.

Figure 2:
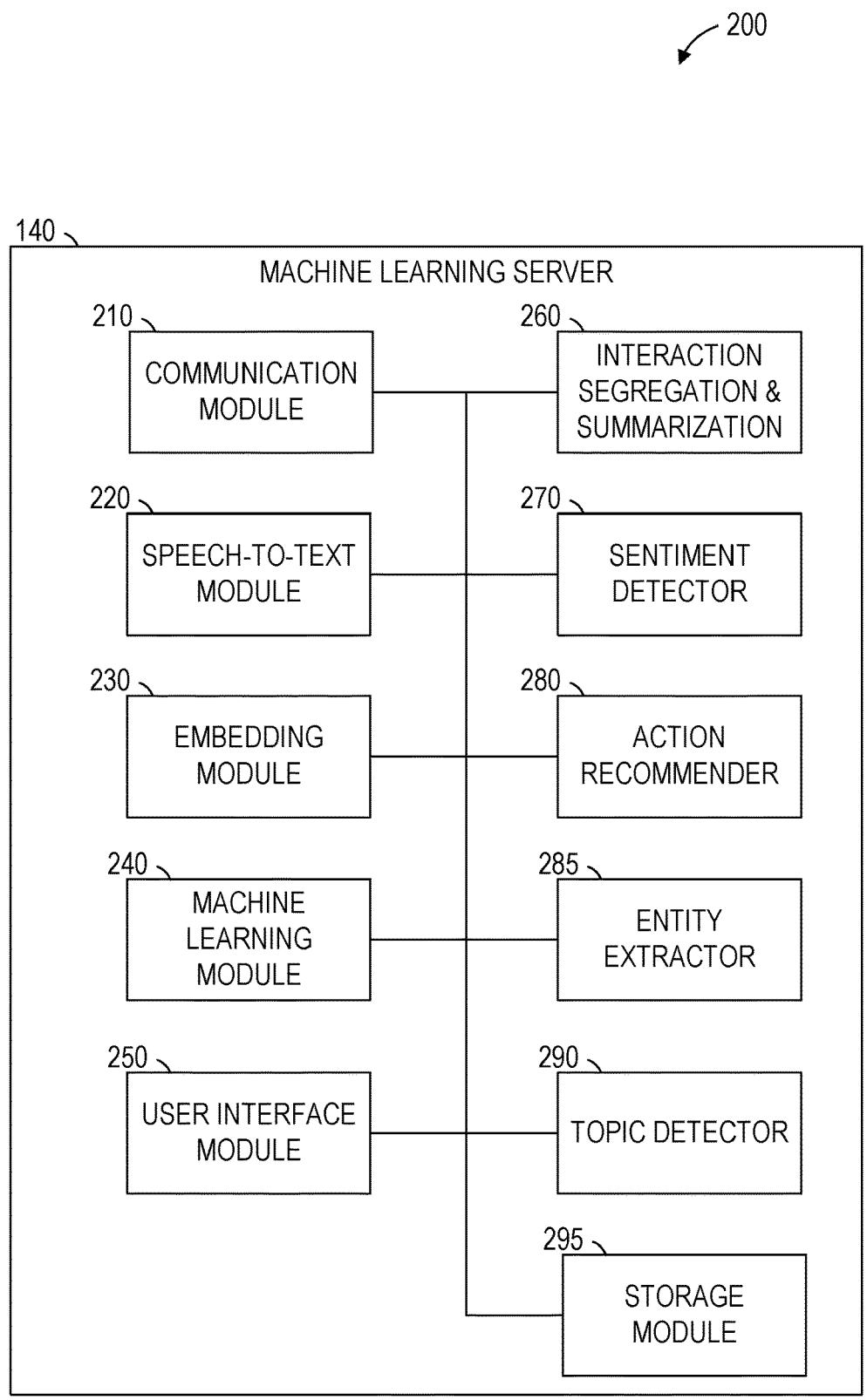
FIG. 2 is a block diagram of an example machine learning server, suitable for machine learning for multi-channel interaction workflows.

FIG. 2 is a block diagram 200 of an example machine learning server 140, suitable for machine learning for multi-channel interaction workflows. The machine learning server 140 is shown as including a communication module 210, a speech-to-text module 220, an embedding module 230, a machine learning module 240, a user interface module 250, an interaction segregation and summarization (IS&S) module 260, a sentiment detector 270, an action recommender 280, an entity extractor 285, a topic detector 290, and a storage module 295, all configured to communicate with each other (e.g., via a bus, shared memory, or a switch). Any one or more of the modules described herein may be implemented using hardware (e.g., a processor of a machine). For example, any module described herein may be implemented by a processor configured to perform the operations described herein for that module. Moreover, any two or more of these modules may be combined into a single module, and the functions described herein for a single module may be subdivided among multiple modules. Furthermore, modules described herein as being implemented within a single machine, database, or device may be distributed across multiple machines, databases, or devices.

The communication module 210 receives data sent to the machine learning server 140 and transmits data from the machine learning server 140. For example, the communication module 210 may receive, from the email server 160 or the SMS server 150, interaction data for use by other modules in applying machine learning to multi-channel interaction workflows. The interaction data may be stored on the machine learning server 140 (e.g., on a hard drive) or in remote storage (e.g., a network storage device). Communications sent and received by the communication module 210 may be intermediated by the network 195.

The speech-to-text module 220 receives audio input and generates text output. For example, a live or recorded voice call can be provided as input and a transcript of the voice call is generated as output. Thus, by use of the speech-to-text module 220, voice interactions are converted to text, allowing them to be processed using the same tools that process other text interactions such as SMS messages and email.

The machine learning server 140 generates language embedding vectors for the source code using the embedding module 230. The embedding module 230 may receive, as input, text for an interaction and generate, as output, a high-dimensional vector representing the interaction. The embedding may be performed using a trained machine learning model.

The machine learning module 240 trains machine learning models to perform various functions based on training data.

For example, a machine learning model may be trained using input interactions labeled with results (e.g., names and amounts of products sold to a customer involved in the interaction within a predetermined period of time after the interaction). This machine learning model is trained to generate a predicted result based on an interaction. Other machine learning models may be trained to determine which portions of an interaction (or a series of interactions) originate from each individual or organization involved in the interaction, or to perform other functions, as discussed below with respect to the IS&S module 260, the sentiment detector 270, the action recommender 280, the entity extractor 285, and the topic detector 290.

A user interface for searching is provided by the machine learning server 140 using the user interface module 250. For example, a hypertext markup language (HTML) document may be generated by the user interface module 250, transmitted to a client device 190 by the communication module 210, and rendered on a display device of the client device 190 by a web browser executing on the client device 190. The user interface may comprise text fields, drop-down menus, and other inputs fields. The user interface may also comprise results and recommendations.

The IS&S module 260 comprises a trained machine learning model.

The trained machine learning model receives input vectors for interactions between organizations and generates output that indicates the portions of the interactions generated by each organization, each individual, or both. The output may further be used to generate a summary of the interactions. For example, one or more output vectors from the IS&S module 260 may be provided as input to another trained machine learning model that generates natural language text from embedding vector input. The natural language text may be stored and presented as a summary of one or more interactions.

Example input data to the IS&S module 260 may be in the format shown below.

[{"participant_name": "<participant_name_1>",
"participant_id"<participant_id_1>",
"participant_transcript": "hello. This is _____, how can I help you?"},
{"participant_name": "<participant_name_2>",
"participant_id": "participant_id_2>",
"participant_transcript": "hello. This is _____, please help me with . . . "}, . . . ]

In the example above, each portion of the interaction is presented in sequential order, including metadata indicating a name and identifier of the individual participant that contributed the portion of the interaction. Example output data from the IS&S module 260 may be in the format shown below.

{
"participant_summary": "<summary of each individual participant's interactions>"
"organization_summary": "<summary generated for multiple interactions with an organization>"
}

In the example above, the participant_summary section comprises multiple summaries, one for each individual participant. The organization_summary section comprises a single summary for the organization. Broader or more granular sentiment analysis and recommendations may be generated based on the summary data at different levels of granularity.

Sentiment of the interactions may be determined by the sentiment detector 270. The sentiment detector 270 (e.g., a trained machine learning model) receives input vectors for interactions between organizations and generates output that indicates the sentiment of one or more of the organizations, individual participants, or both.

The action recommender 280 recommends one or more actions to be taken by an organization or an individual. A trained machine learning model of the action recommender 280 receives input vectors for interactions between organizations and generates output that indicates the recommended action.

Identities of entities discussed in interactions may be determined by the entity extractor 285. The entity extractor 285 receives text or embedding vectors for one or more interactions as input and identifies the entities or individuals discussed in the interactions as output. The entity identity data may be used as part of the input to one or more of the IS&S module 260, the sentiment detector 270, and the action recommender 280.

Topics discussed in interactions may be determined by the topic detector 290. The topic detector 290 receives text or embedding vectors for one or more interactions as input and identifies the topics discussed. The identified topics may be used as part of the input to one or more of the IS&S module 260, the sentiment detector 270, and the action recommender 280.

Inputs to the sentiment detector 270, the action recommender 280, the entity extractor 285, the topic detector 290, or any suitable combination thereof, may be in the form of the data object below.

{
    "uuid": "89d11deef94311eb9abdacde4800112",
    "record_id":
        "16496C475EE5EB118293025F50BA5EEC",
    "interaction_duration": "112s",
    "language": "en",
    "sentiment": "WEAK POSITIVE",
    "agent_summary": " ",
    "customer_summary": " ",
    "entities": [
    {"entity": "ProductID", "entity_name": "10101", "confidence": "59"},
    {"entity": "OrderID", "entity_name": "90003", "confidence": "98"}],
    "topics": ["issue with TV", "fix remote"]
}

The data object above comprises a unique user identifier (uuid) that identifies a customer organization, a record identifier (record_id) that identifies the interaction, and additional metadata for the interaction. The additional metadata comprises a duration (112 seconds, in this example), one or more languages of the interaction ("en," indicating English, in this example), a sentiment, a summary for each participant, identifiers for the entities discussed in the interaction, topics of the interaction, or any suitable combination thereof. Portions of the data object may be populated by various modules or machine learning models. For example, the uuid, record_id, interaction_duration, and language may all be associated with the interaction before any processing by the machine learning server 140 is performed. The agent_summary and customer_summary fields may be populated by the IS&S module 260. The sentiment field may be populated by the sentiment detector 270. The entities field may be populated by the entity extractor 285. The topics field may be populated by the topic detector 290.

Trained machine learning models, search queries, search results, or any suitable combination thereof may be stored and accessed by the storage module 295. For example, local storage of the machine learning server 140, such as a hard drive, may be used. As another example, network storage may be accessed by the storage module 295 via the network 195.

Figure 3:
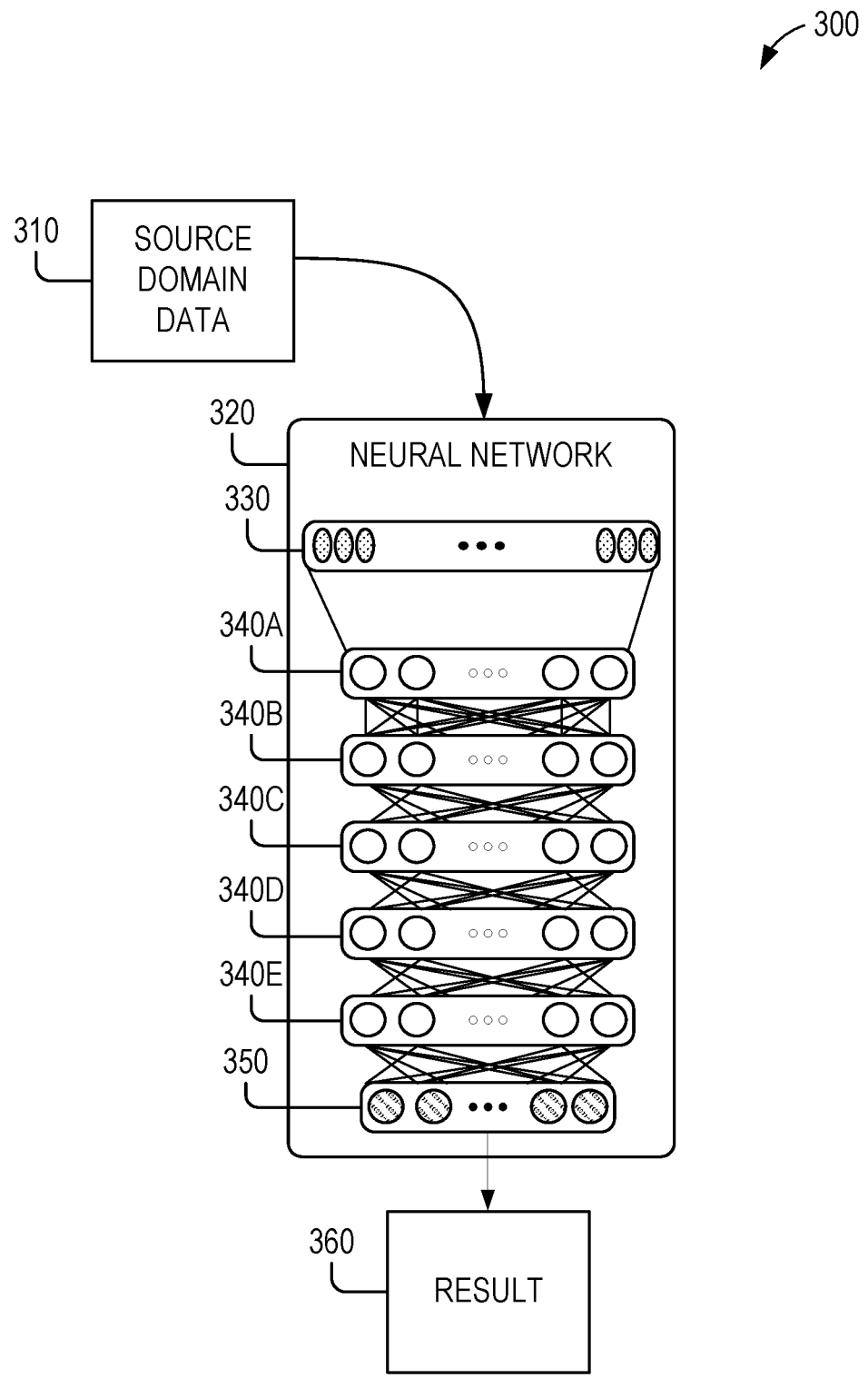
FIG. 3 is a block diagram of an example neural network, suitable for use in segregating interactions, summarizing interactions, detecting sentiment, recommending actions, identifying entities, or any suitable combination thereof.

FIG. 3 illustrates the structure 300 of an example neural network 320. The neural network 320 takes source domain data 310 as input and processes the source domain data 310 using the input layer 330; the intermediate, hidden layers 340A, 340B, 340C, 340D, and 340E; and the output layer 350 to generate a result 360.

A neural network, sometimes referred to as an artificial neural network, is a computing system based on consideration of biological neural networks of animal brains. Such systems progressively improve performance, which is referred to as learning, to perform tasks, typically without task-specific programming. For example, in image recognition, a neural network may be taught to identify images that contain an object by analyzing example images that have been tagged with a name for the object and, having learnt the object and name, may use the analytic results to identify the object in untagged images.

A neural network is based on a collection of connected units called neurons, where each connection, called a synapse, between neurons can transmit a unidirectional signal with an activating strength that varies with the strength of the connection. The receiving neuron can activate and propagate a signal to downstream neurons connected to it, typically based on whether the combined incoming signals, which are from potentially many transmitting neurons, are of sufficient strength, where strength is a parameter.

Each of the layers 330-350 comprises one or more nodes (or "neurons"). The nodes of the neural network 320 are shown as circles or ovals in FIG. 3. Each node takes one or more input values, processes the input values using zero or more internal variables, and generates one or more output values. The inputs to the input layer 330 are values from the source domain data 310. The output of the output layer 350 is the result 360. The intermediate layers 340A-340E are referred to as "hidden" because they do not interact directly with either the input or the output, and are completely internal to the neural network 320. Though five hidden layers are shown in FIG. 3, more or fewer hidden layers may be used.

A model may be run against a training dataset for several epochs, in which the training dataset is repeatedly fed into the model to refine its results. In each epoch, the entire training dataset is used to train the model. Multiple epochs (e.g., iterations over the entire training dataset) may be used to train the model. The number of epochs may be 10, 100, 500, 1000, or another number. Within an epoch, one or more batches of the training dataset are used to train the model. Thus, the batch size ranges between 1 and the size of the training dataset while the number of epochs is any positive integer value. The model parameters are updated after each batch (e.g., using gradient descent).

In a supervised learning phase, a model is developed to predict the output for a given set of inputs, and is evaluated over several epochs to more reliably provide the output that is specified as corresponding to the given input for the greatest number of inputs for the training dataset. The training dataset comprises input examples with labeled outputs. For example, a user may label images based on their content and the labeled images used to train an image identifying model to generate the same labels.

For self-supervised learning, the training dataset comprises self-labeled input examples. For example, a set of color images could be automatically converted to black-andwhite images. Each color image may be used as a "label" for the corresponding black-and-white image, and used to train a model that colorizes black-and-white images. This process is self-supervised because no additional information, outside of the original images, is used to generate the training dataset. Similarly, when text is provided by a user, one word in a sentence can be masked and the network trained to predict the masked word based on the remaining words.

Each model develops a rule or algorithm over several epochs by varying the values of one or more variables affecting the inputs to more closely map to a desired result, but as the training dataset may be varied, and is preferably very large, perfect accuracy and precision may not be achievable. A number of epochs that make up a learning phase, therefore, may be set as a given number of trials or a fixed time/computing budget, or may be terminated before that number/budget is reached when the accuracy of a given model is high enough or low enough or an accuracy plateau has been reached. For example, if the training phase is designed to run n epochs and produce a model with at least 95% accuracy, and such a model is produced before the nth epoch, the learning phase may end early and use the produced model satisfying the end-goal accuracy threshold. Similarly, if a given model is inaccurate enough to satisfy a random chance threshold (e.g., the model is only 55% accurate in determining true/false outputs for given inputs), the learning phase for that model may be terminated early, although other models in the learning phase may continue training. Similarly, when a given model continues to provide similar accuracy or vacillate in its results across multiple epochs-having reached a performance plateau—the learning phase for the given model may terminate before the epoch number/computing budget is reached.

Once the learning phase is complete, the models are finalized. The finalized models may be evaluated against testing criteria. In a first example, a testing dataset that includes known outputs for its inputs is fed into the finalized models to determine an accuracy of the model in handling data that it has not been trained on. In a second example, a false positive rate or false negative rate may be used to evaluate the models after finalization. In a third example, a delineation between data clusters is used to select a model that produces the clearest bounds for its clusters of data.

The neural network 320 may be a deep learning neural network, a deep convolutional neural network, a recurrent neural network, or another type of neural network. A neuron is an architectural element used in data processing and artificial intelligence, particularly machine learning. A neuron implements a transfer function by which a number of inputs are used to generate an output. The inputs may be weighted and summed, with the result compared to a threshold to determine if the neuron should generate an output signal (e.g., a 1) or not (e.g., a 0 output). Through the training of a neural network, the inputs of the component neurons are modified. One of skill in the art will appreciate that neurons and neural networks may be constructed programmatically (e.g., via software instructions) or via specialized hardware linking each neuron to form the neural network.

An example type of layer in the neural network 320 is a Long Short Term Memory (LSTM) layer. An LSTM layer includes several gates to handle input vectors (e.g., time-series data), a memory cell, and an output vector. The input gate and output gate control the information flowing into and out of the memory cell, respectively, whereas forget gates optionally remove information from the memory cell based on the inputs from linked cells earlier in the neural network. Weights and bias vectors for the various gates are adjusted over the course of a training phase, and once the training phase is complete, those weights and biases are finalized for normal operation.

A deep neural network (DNN) is a stacked neural network, which is composed of multiple layers. The layers are composed of nodes, which are locations where computation occurs, loosely patterned on a neuron in the human brain, which fires when it encounters sufficient stimuli. A node combines input from the data with a set of coefficients, or weights, that either amplify or dampen that input, which assigns significance to inputs for the task the algorithm is trying to learn. These input-weight products are summed, and the sum is passed through what is called a node's activation function, to determine whether and to what extent that signal progresses further through the network to affect the ultimate outcome. A DNN uses a cascade of many layers of non-linear processing units for feature extraction and transformation. Each successive layer uses the output from the previous layer as input. Higher-level features are derived from lower-level features to form a hierarchical representation. The layers following the input layer may be convolution layers that produce feature maps that are filtering results of the inputs and are used by the next convolution layer.

In training of a DNN architecture, a regression, which is structured as a set of statistical processes for estimating the relationships among variables, can include a minimization of a cost function. The cost function may be implemented as a function to return a number representing how well the neural network performed in mapping training examples to correct output. In training, if the cost function value is not within a pre-determined range, based on the known training images, backpropagation is used, where backpropagation is a common method of training artificial neural networks that are used with an optimization method such as a stochastic gradient descent (SGD) method.

Use of backpropagation can include propagation and weight update. When an input is presented to the neural network, it is propagated forward through the neural network, layer by layer, until it reaches the output layer. The output of the neural network is then compared to the desired output, using the cost function, and an error value is calculated for each of the nodes in the output layer. The error values are propagated backwards, starting from the output, until each node has an associated error value which roughly represents its contribution to the original output. Backpropagation can use these error values to calculate the gradient of the cost function with respect to the weights in the neural network. The calculated gradient is fed to the selected optimization method to update the weights to attempt to minimize the cost function.

The structure of each layer may be predefined. For example, a convolution layer may contain small convolution kernels and their respective convolution parameters, and a summation layer may calculate the sum, or the weighted sum, of two or more values. Training assists in defining the weight coefficients for the summation.

One way to improve the performance of DNNs is to identify newer structures for the feature-extraction layers, and another way is by improving the way the parameters are identified at the different layers for accomplishing a desired task. For a given neural network, there may be millions of parameters to be optimized. Trying to optimize all these parameters from scratch may take hours, days, or even weeks, depending on the amount of computing resources available and the amount of data in the training set.

One of ordinary skill in the art will be familiar with several machine learning algorithms that may be applied with the present disclosure, including linear regression, random forests, decision tree learning, neural networks, deep neural networks, genetic or evolutionary algorithms, and the like.

Figure 4:
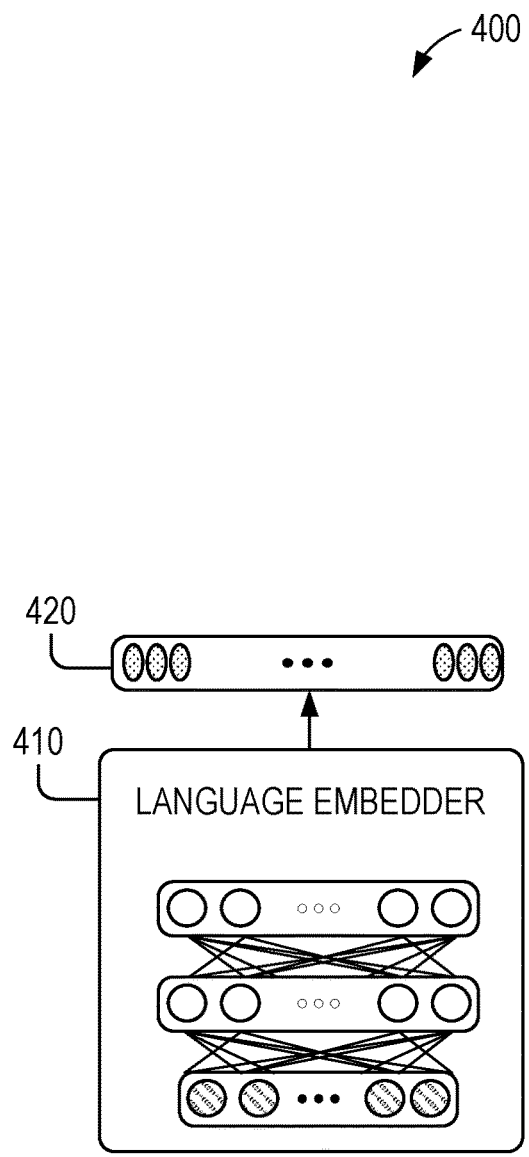
FIG. 4 is a block diagram of an example neural network, suitable for generating language embeddings for natural languages.

FIG. 4 is a block diagram of an example model architecture 400 for language embedding. The model architecture 400 includes a language embedder 410 and a resulting vector 420. The language embedder 410 is trained so that the distance (or loss) function for two related text strings is reduced or minimized. For example, synonymous natural language text or programming language text may be provided as inputs and the language embedder 410 trained to minimize the distance between the resulting vectors.

The specific architecture of the language embedder 410 may be chosen dependent on the type of input data for an embedding layer that is followed by some encoder architecture that creates a vector from the sequence. Embeddings and encoder parameters are shared between the text fields. In the simplest case the encoder stage is just an elementwise average of the token embeddings.

Alternatively, the encoding may include converting pairs of words of the text to bigram vectors and combining the bigram vectors to generate a vector for the text. For example, the text "function performs" may have a corresponding vector as a bigram, rather than two separate vectors for "function" and "performs" that are combined. The text "This function processes incoming emails to detect junk" may be stripped of articles and prepositions and converted to vectors for each of the bigrams "This function," "function processes," "processes incoming," "incoming emails," "emails detect," and "detect junk." The vector for a text string may be determined as an average of the bigram vectors for the bigrams in the text string.

In some example embodiments, a pre-trained vector embedding is used rather than training an embedding on a training set. For example, the doc2vec embedding may be used.

Figure 5:
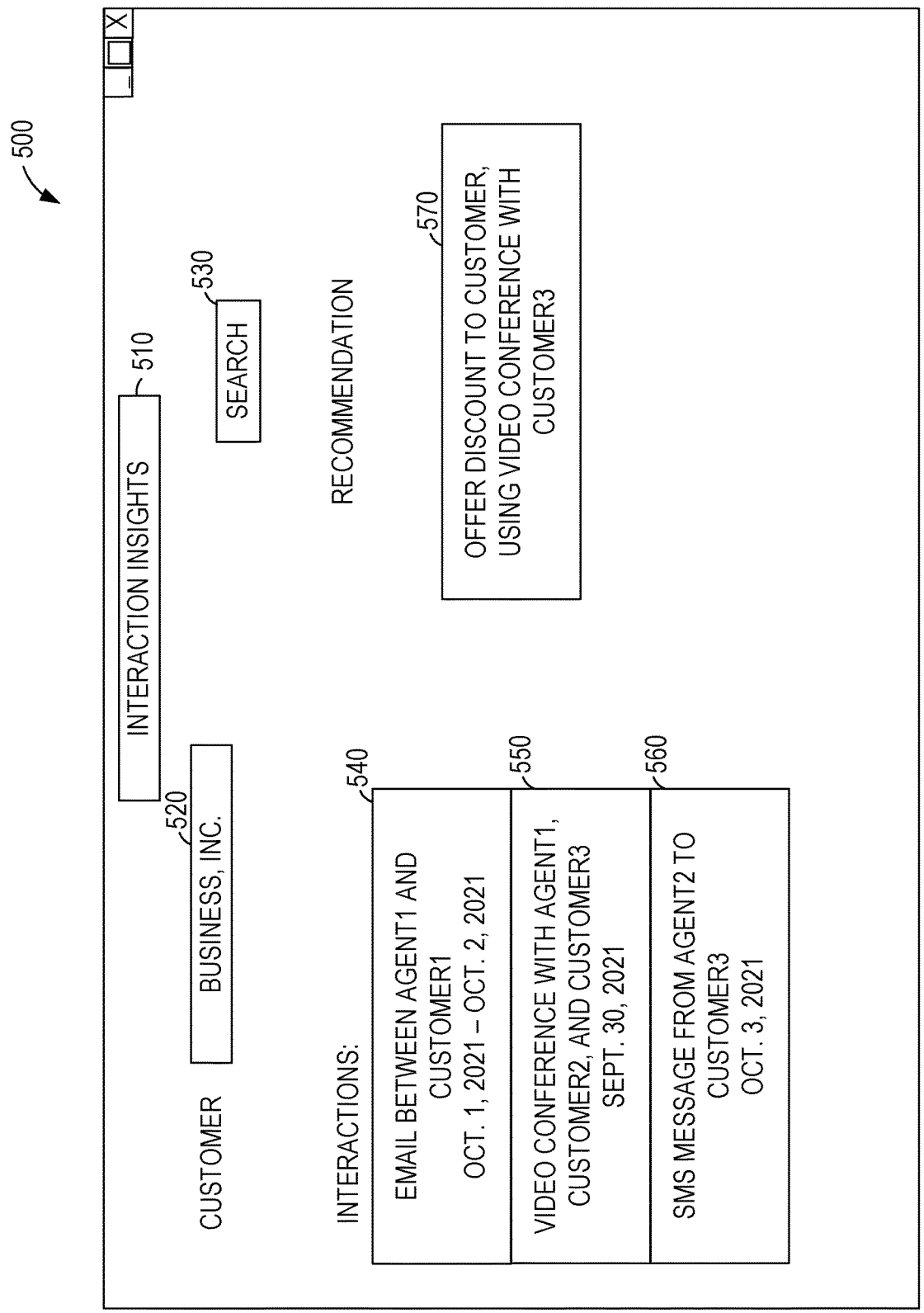
FIG. 5 is a block diagram of an example user interface, suitable for searching interactions, presenting search results, and presenting action recommendations.

FIG. 5 is a block diagram of an example user interface 500, suitable for searching interactions, presenting search results, and presenting action recommendations. The user interface 500 includes a title 510; an input field 520; a button 530; interaction information 540, 550, and 560; and a recommendation 570. The user interface 500 may be displayed on a display device of the client device 190A or 190B in response to a request from a user of the client device 190A or 190B. For example, a user may press a button on a user interface that causes the user interface 500 to be presented (e.g., by causing the application server 120 to generate an HTML document and provide it to the client device 190A for rendering the user interface 500 on a display device of the client device 190A).

The title 510 indicates that the user interface 500 is for presenting interaction insights. The user interacts with the input field 520 to select a customer organization for which interaction insights will be presented. For example, the input field 520 may be implemented as a drop-down selector that allows the user to select the customer organization from a list of customer organizations. Alternatively, the input field 520 may be implemented as a text field that allows the user to enter the names of one or more customer organizations. After selecting the customer, the user may press the button 530 to submit the selection to the application server 120 via the network 195.

In response to receiving data identifying the customer organization (e.g., a unique numeric identifier or a text string comprising the name of the customer organization), the application server 120 accesses data from the database server 130 and identifies one or more interactions with the customer organization. The application server 120 provides data for at least a subset of the identified interactions to the client device 190A for display in the user interface 500.

In the example of FIG. 5, information for three interactions 540-560 are provided and displayed. In the example of FIG. 5, the displayed information includes the type of the interaction (e.g., email, video conference, or SMS message), the names of the participants in the interaction, and the date or dates of the interaction. More or fewer pieces of information may be displayed. For example, the date information may include a time of day, day of week, or both. The participant information may include statistics regarding the percentage of the interaction that was performed by each participant. In the example of FIG. 5, Agent1 and Agent2 are the names of two representatives of an organization that provides a product or service and Customer1, Customer2, and Customer3 are names of representatives of the customer organization identified in the input field 520.

The interaction information 540-560 may be operable to cause additional details regarding a selected interaction to be displayed. For example, text of the interaction may be displayed for review by the user.

In addition to or instead of the interaction information 540-560, one or more recommendations (e.g., the recommendation 570) may be displayed. The recommendation 570 suggests that a video conference with Employee3 be used to offer a discount.

By use of the user interface 500, a user is enabled to review multiple customer interactions, even when the interactions are with different people and by different channels. Additionally, the user interface 500 includes a recommendation for a next action by the user. Accordingly, technical improvement is provided over systems that only allow review of interactions using a single channel, do not provide action recommendations, or both.

Figure 6:
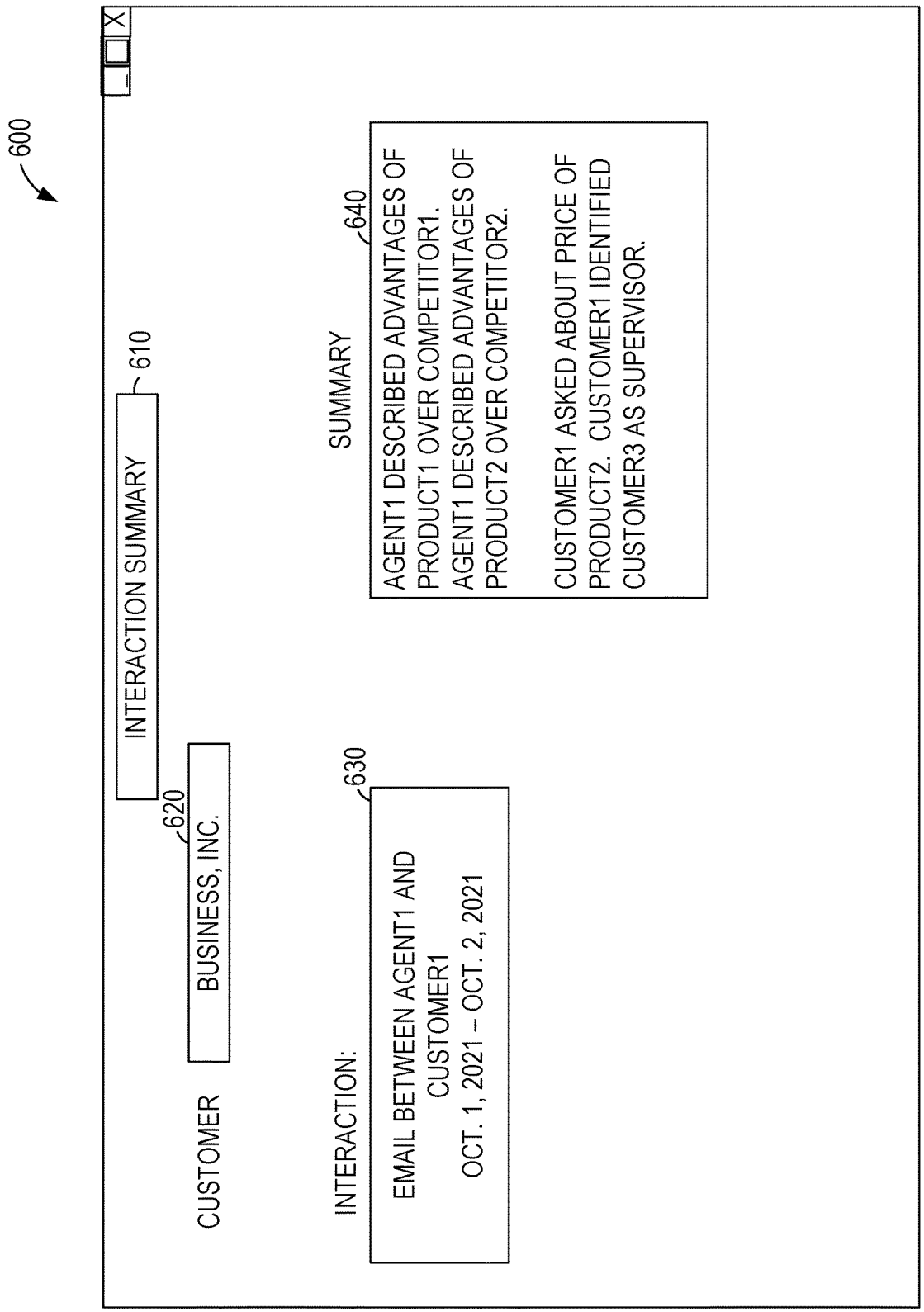
FIG. 6 is a block diagram of an example user interface, suitable for presenting an interaction summary.

FIG. 6 is a block diagram of an example user interface 600, suitable for presenting an interaction summary. The user interface 600 includes a title 610; a customer identifier field 620; interaction information 630; and a summary 640. The user interface 600 may be displayed on a display device of the client device 190A or 190B in response to a request from a user of the client device 190A or 190B. For example, a user may click or tap one of the interaction information 540-560, causing the user interface 600 to be displayed for the selected interaction information.

The title 610 indicates that the user interface 600 presents an interaction summary. The customer identifier field 620 indicates the customer organization with which the interaction took place. The interaction information 630 shows information for the interaction, such as the medium through which the interaction took place, the participants in the interaction, the dates of the interaction, and the like. The summary 640 shows a summary of the interaction generated by the IS&S module 260. In the example of FIG. 6, Competitor1 and Competitor2 are names of organizations competing with the organization represented by Agent1.

Figure 7:
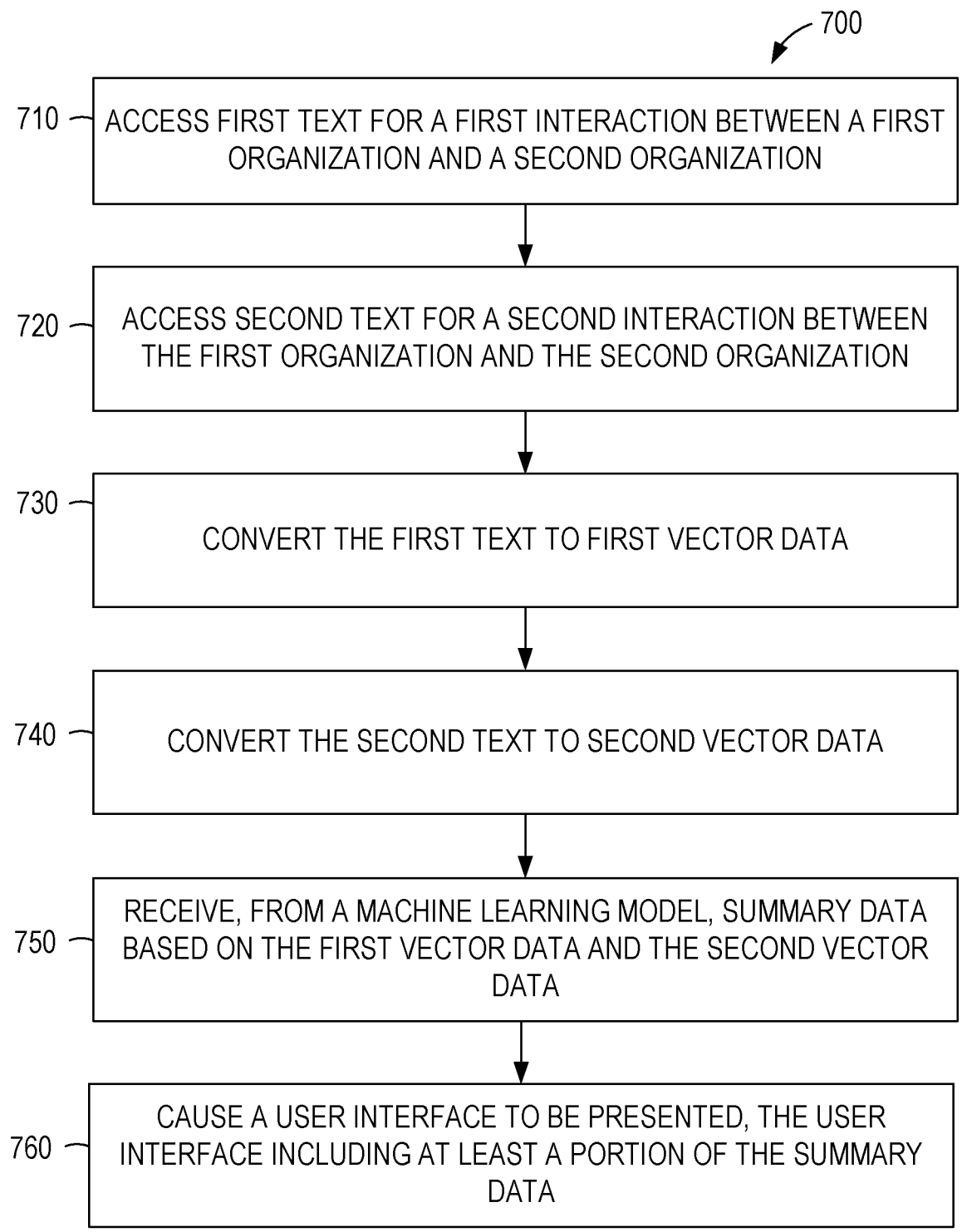
FIG. 7 is a flowchart illustrating operations of an example method suitable for machine learning for multi-channel interaction workflows.

FIG. 7 is a flowchart illustrating operations of an example method 700 suitable for machine learning for multi-channel interaction workflows. The method 700 includes operations 710, 720, 730, 740, 750, and 760. By way of example and not limitation, the method 700 may be performed by the application server 120 or the machine learning server 140 of FIG. 1, using the modules, databases, images, servers, and user interfaces shown in FIGS. 1-6.

In operation 710, the embedding module 230 of the machine learning server 140 accesses first text for a first interaction between a first organization and a second organization. The first organization may be an organization providing a product or service and the second organization may be an actual or potential purchaser of the product or service. The first text for the first interaction may be accessed from the SMS server 150 or the email server 160. Alternatively, the first interaction may have been a voice interaction converted to text by the speech-to-text module 220 and stored by (and accessed from) the database server 130.

The embedding module 230, in operation 720, accesses second text for a second interaction between the first organization and the second organization. The second interaction may be between or among the same individuals as the first interaction, include some of the same individuals, or comprise a non-overlapping set of individuals. For example, the first interaction may be between a salesperson of the first organization and a receptionist of the second organization and the second interaction may be between the salesperson and an officer of the second organization. The second interaction may have been made using the same channel as the first interaction (e.g., both interactions by email) or using different channels (e.g., an email and a voice communication).

In operations 730 and 740, the embedding module 230 converts the first text to first vector data and converts the second text to second vector data. Thus, vector representations of the communications, suitable for input to one or more trained machine learning models, are generated.

The user interface module 250, in operation 750, receives, from a machine learning model (e.g., the IS&S module 260), summary data based on the first vector data and the second vector data. The summary data may include a first summary for communications from the first organization and a second summary for communications from the second organization. For example, the IS&S module 260 may segregate the text of the interactions by identifying which portions of the text originate from each organization and may summarize the portion of text for each organization separately. Additionally or alternatively, the summary data may include a first summary for communications of a first individual of the first organization and a second summary for communications of a second individual of the first organization. For example, the IS&S module 260 may segregate the text of the interactions by identifying which portions of the text originate from each individual and may summarize the portion of text for each individual separately. The summary data may be stored in a JavaScript object notation (JSON) data object.

In operation 760, the user interface module 250 causes a user interface to be presented, the user interface including at least a portion of the summary data. For example, the user interface 600 may be presented on a display device of one of the client devices 190A-190B.

By way of example and not limitation, the method 700 is described as presenting summary data based on two interactions. However, more or fewer interactions may be used. For example, dozens of interactions using many different channels may each be converted to vector data and provided as input to the IS&S module 260 for the generation of summary data.

Figure 8:
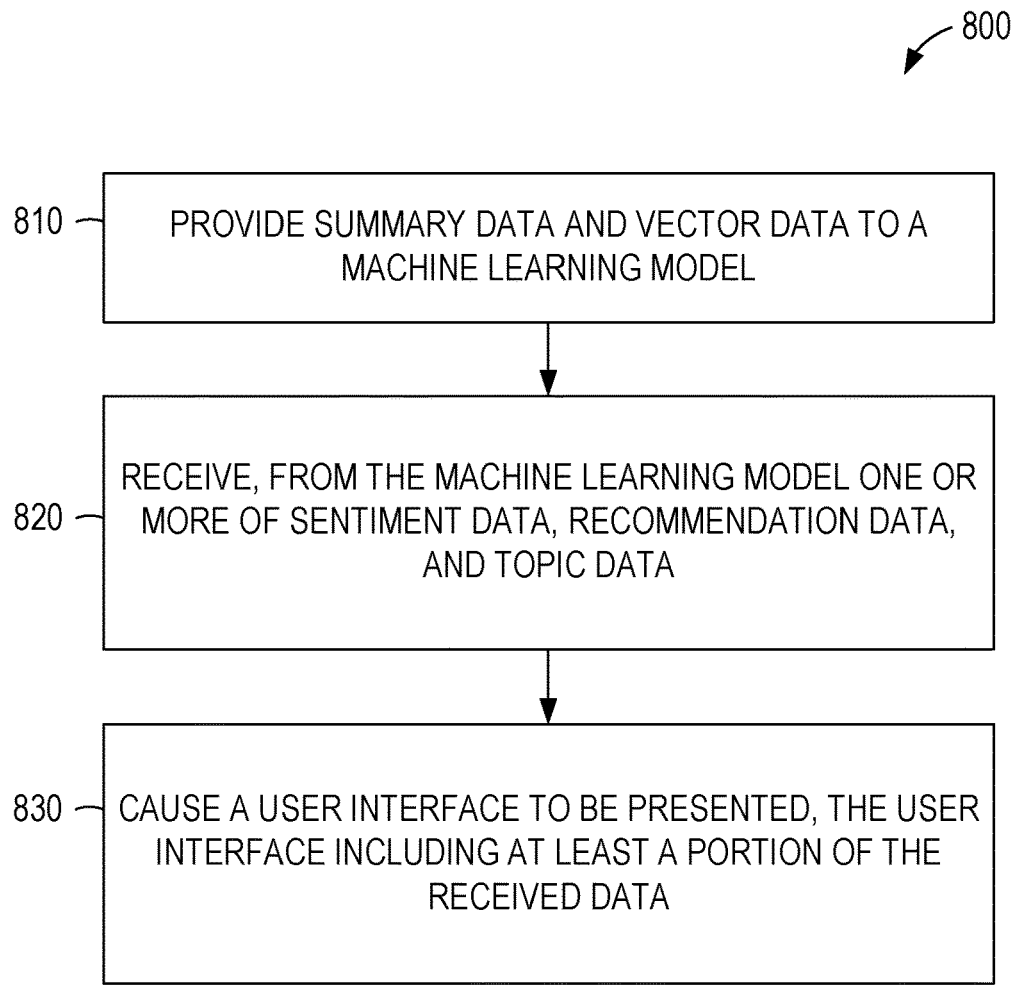
FIG. 8 is a flowchart illustrating operations of an example method suitable for machine learning for multi-channel interaction workflows.

FIG. 8 is a flowchart illustrating operations of an example method 800 suitable for machine learning for multi-channel interaction workflows. The method 800 includes operations 810, 820, and 830. By way of example and not limitation, the method 800 may be performed by the application server 120 or the machine learning server 140 of FIG. 1, using the modules, databases, images, servers, and user interfaces shown in FIGS. 1-6.

In operation 810, the machine learning server 140 provides summary data and vector data to a machine learning model. For example, the vector data input to the IS&S module 260 and the summary data generated by the IS&S module 260 may both be provided as input to the sentiment detector 270, the action recommender 280, or the topic detector 290.

The user interface module 250 of the machine learning server 140 receives, from the machine learning model, one or more of sentiment data, recommendation data, and topic data (operation 820). In operation 830, the user interface module 250 causes a user interface to be presented, the user interface including at least a portion of the received data. For example, the user interface 500 may be presented on a display device of one of the client devices 190A-190B. Thus, by use of the method 800, additional predictions and recommendations may be generated by machine learning models and presented to a user. The outputs of the machine learning models used in the method 800 are generated based on both vectorized versions of interactions and the output of another machine learning model (e.g., the IS&S module 260).

In view of the above-described implementations of subject matter this application discloses the following list of examples, wherein one feature of an example in isolation or more than one feature of an example, taken in combination and, optionally, in combination with one or more features of one or more further examples are further examples also falling within the disclosure of this application.

Example 1 is a method comprising: accessing, by one or more processors, first text for a first interaction between a first organization and a second organization; accessing, by the one or more processors, second text for a second interaction between the first organization and the second organization; converting the first text to first vector data in a vector format; converting the second text to second vector data in the vector format; receiving, from a machine learning model, summary data based on the first vector data and the second vector data; and causing a user interface to be presented that includes, at least a portion of the summary data.

In Example 2, the subject matter of Example 1 includes accessing first audio for the first interaction; and generating the first text using speech-to-text conversion of the first audio.

In Example 3, the subject matter of Examples 1-2, wherein the summary data includes a first summary for communications from the first organization and a second summary for communications from the second organization.

In Example 4, the subject matter of Examples 1-3, wherein the summary data includes a first summary for communications of a first individual of the first organization and a second summary for communications of a second individual of the first organization.

In Example 5, the subject matter of Examples 1~4 includes receiving, from a second machine learning model, sentiment data based on the summary data; wherein the user interface includes at least a portion of the sentiment data.

In Example 6, the subject matter of Examples 1-5 includes receiving, from a second machine learning model, topic data based on the summary data; wherein the user interface includes at least a portion of the topic data.

In Example 7, the subject matter of Examples 1-6 includes receiving, from a second machine learning model, recommendation data based on the summary data; wherein the user interface includes at least a portion of the recommendation data.

Example 8 is a system comprising: a memory that stores instructions; and one or more processors configured by the instructions to perform operations comprising: accessing first text for a first interaction between a first organization and a second organization; accessing second text for a second interaction between the first organization and the second organization; converting the first text to first vector data in a vector format; converting the second text to second vector data in the vector format; receiving, from a machine learning model, summary data based on the first vector data and the second vector data; and causing a user interface to be presented that includes, at least a portion of the summary data.

In Example 9, the subject matter of Example 8, wherein the operations further comprise: accessing first audio for the first interaction; and generating the first text using speech-to-text conversion of the first audio.

In Example 10, the subject matter of Examples 8-9, wherein the summary data includes a first summary for communications from the first organization and a second summary for communications from the second organization.

In Example 11, the subject matter of Examples 8-10, wherein the summary data includes a first summary for communications of a first individual of the first organization and a second summary for communications of a second individual of the first organization.

In Example 12, the subject matter of Examples 8-11, wherein the operations further comprise: receiving, from a second machine learning model, topic data based on the summary data; wherein the user interface includes at least a portion of the topic data.

In Example 13, the subject matter of Examples 8-12, wherein the operations further comprise: receiving, from a second machine learning model, sentiment data based on the summary data; wherein the user interface includes at least a portion of the sentiment data.

In Example 14, the subject matter of Examples 8-13, wherein the operations further comprise: receiving, from a second machine learning model, recommendation data based on the summary data; wherein the user interface includes at least a portion of the recommendation data.

Example 15 is a non-transitory computer-readable medium that stores instructions that, when executed by one or more processors, cause the one or more processors to perform operations comprising: accessing first text for a first interaction between a first organization and a second organization; accessing second text for a second interaction between the first organization and the second organization; converting the first text to first vector data in a vector format; converting the second text to second vector data in the vector format; receiving, from a machine learning model, summary data based on the first vector data and the second vector data; and causing a user interface to be presented that includes, at least a portion of the summary data.

In Example 16, the subject matter of Example 15, wherein the operations further comprise: accessing first audio for the first interaction; and generating the first text using speech-to-text conversion of the first audio.

In Example 17, the subject matter of Examples 15-16, wherein the summary data includes a first summary for communications from the first organization and a second summary for communications from the second organization.

In Example 18, the subject matter of Examples 15-17, wherein the summary data includes a first summary for communications of a first individual of the first organization and a second summary for communications of a second individual of the first organization.

In Example 19, the subject matter of Examples 15-18, wherein the operations further comprise: receiving, from a second machine learning model, sentiment data based on the summary data; wherein the user interface includes at least a portion of the sentiment data.

In Example 20, the subject matter of Examples 15-19, wherein the operations further comprise: receiving, from a second machine learning model, sentiment data based on the summary data; wherein the user interface includes at least a portion of the sentiment data.

Example 21 is at least one machine-readable medium including instructions that, when executed by processing circuitry, cause the processing circuitry to perform operations to implement any of Examples 1-20.

Example 22 is an apparatus comprising means to implement any of Examples 1-20.

Example 23 is a system to implement any of Examples 1-20.

Example 24 is a method to implement any of Examples 1-20.

Figure 9:
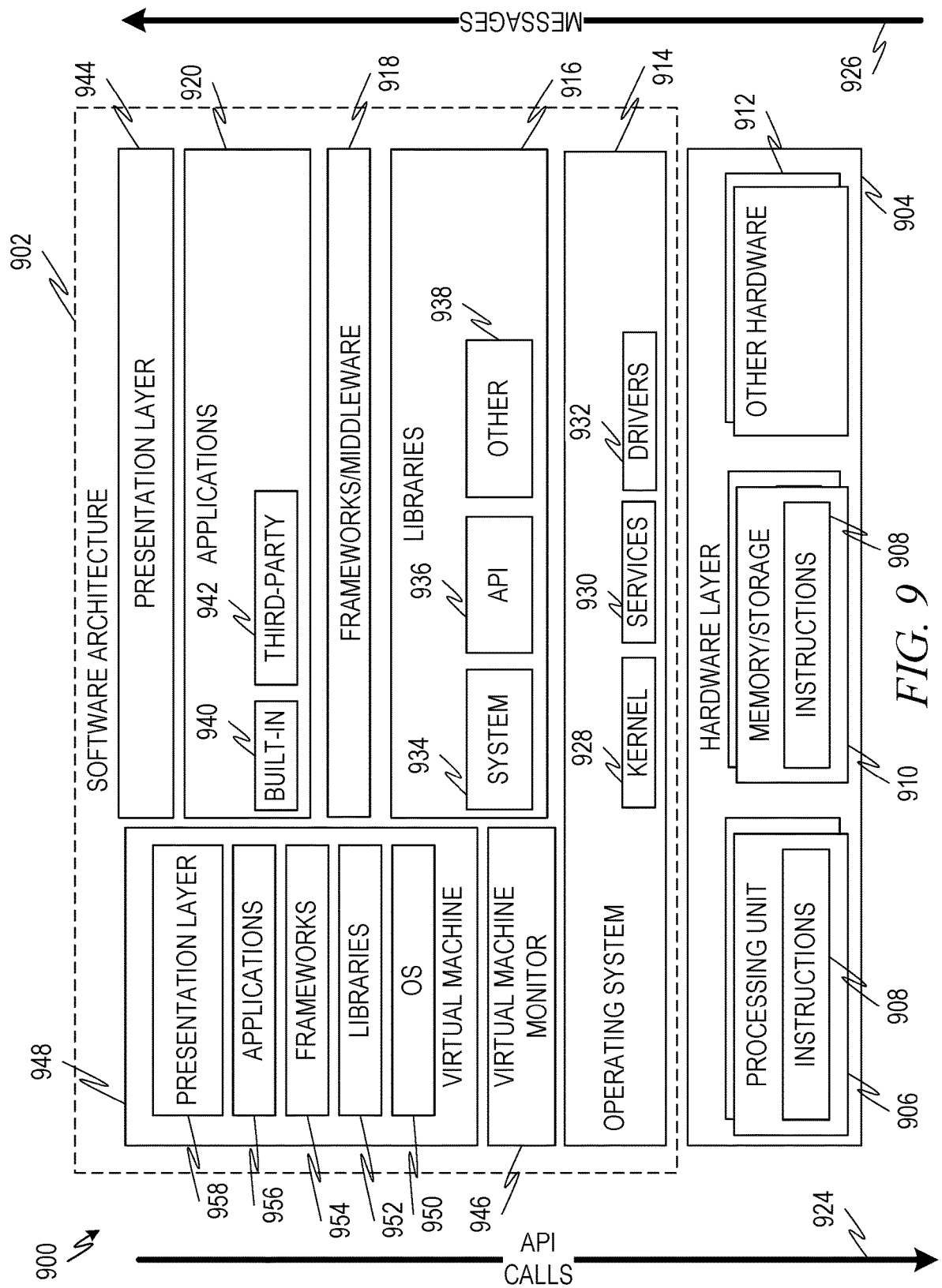
FIG. 9 is a block diagram showing one example of a software architecture for a computing device.

FIG. 9 is a block diagram 900 showing one example of a software architecture 902 for a computing device. The architecture 902 may be used in conjunction with various hardware architectures, for example, as described herein. FIG. 9 is merely a non-limiting example of a software architecture and many other architectures may be implemented to facilitate the functionality described herein. A representative hardware layer 904 is illustrated and can represent, for example, any of the above referenced computing devices. In some examples, the hardware layer 904 may be implemented according to the architecture of the computer system of FIG. 9.

The representative hardware layer 904 comprises one or more processing units 906 having associated executable instructions 908. Executable instructions 908 represent the executable instructions of the software architecture 902, including implementation of the methods, modules, subsystems, and components, and so forth described herein. The representative hardware layer 904 may also include memory and/or storage modules 910, which also have executable instructions 908. Hardware layer 904 may also comprise other hardware as indicated by other hardware 912, which represents any other hardware of the hardware layer 904, such as the other hardware illustrated as part of the software architecture 902.

In the example architecture of FIG. 9, the software architecture 902 may be conceptualized as a stack of layers where each layer provides particular functionality. For example, the software architecture 902 may include layers such as an operating system 914, libraries 916, frameworks/middleware 918, applications 920, and presentation layer 944. Operationally, the applications 920 and/or other components within the layers may invoke application programming interface (API) calls 924 through the software stack and access a response, returned values, and so forth illustrated as messages 926 in response to the API calls 924. The layers illustrated are representative in nature and not all software architectures have all layers. For example, some mobile or special purpose operating systems may not provide a frameworks/middleware 918 layer, while others may provide such a layer. Other software architectures may include additional or different layers.

The operating system 914 may manage hardware resources and provide common services. The operating system 914 may include, for example, a kernel 928, services 930, and drivers 932. The kernel 928 may act as an abstraction layer between the hardware and the other software layers. For example, the kernel 928 may be responsible for memory management, processor management (e.g., scheduling), component management, networking, security settings, and so on. The services 930 may provide other common services for the other software layers. In some examples, the services 930 include an interrupt service. The interrupt service may detect the receipt of an interrupt and, in response, cause the architecture 902 to pause its current processing and execute an interrupt service routine (ISR) when an interrupt is accessed.

The drivers 932 may be responsible for controlling or interfacing with the underlying hardware. For instance, the drivers 932 may include display drivers, camera drivers, Bluetooth® drivers, flash memory drivers, serial communication drivers (e.g., Universal Serial Bus (USB) drivers), Wi-Fi® drivers, NFC drivers, audio drivers, power management drivers, and so forth depending on the hardware configuration.

The libraries 916 may provide a common infrastructure that may be utilized by the applications 920 and/or other components and/or layers. The libraries 916 typically provide functionality that allows other software modules to perform tasks in an easier fashion than to interface directly with the underlying operating system 914 functionality (e.g., kernel 928, services 930 and/or drivers 932). The libraries 916 may include system libraries 934 (e.g., C standard library) that may provide functions such as memory allocation functions, string manipulation functions, mathematic functions, and the like. In addition, the libraries 916 may include API libraries 936 such as media libraries (e.g., libraries to support presentation and manipulation of various media format such as MPEG4, H.264, MP3, AAC, AMR, JPG, PNG), graphics libraries (e.g., an OpenGL framework that may be used to render two-dimensional and three-dimensional in a graphic content on a display), database libraries (e.g., SQLite that may provide various relational database functions), web libraries (e.g., WebKit that may provide web browsing functionality), and the like. The libraries 916 may also include a wide variety of other libraries 938 to provide many other APIs to the applications 920 and other software components/modules.

The frameworks/middleware 918 may provide a higher-level common infrastructure that may be utilized by the applications 920 and/or other software components/modules. For example, the frameworks/middleware 918 may provide various graphic user interface (GUI) functions, high-level resource management, high-level location services, and so forth. The frameworks/middleware 918 may provide a broad spectrum of other APIs that may be utilized by the applications 920 and/or other software components/modules, some of which may be specific to a particular operating system or platform.

The applications 920 include built-in applications 940 and/or third-party applications 942. Examples of representative built-in applications 940 may include, but are not limited to, a contacts application, a browser application, a book reader application, a location application, a media application, a messaging application, and/or a game application. Third-party applications 942 may include any of the built-in applications 940 as well as a broad assortment of other applications. In a specific example, the third-party application 942 (e.g., an application developed using the Android™ or iOS™ software development kit (SDK) by an entity other than the vendor of the particular platform) may be mobile software running on a mobile operating system such as iOS™, Android™, Windows® Phone, or other mobile computing device operating systems. In this example, the third-party application 942 may invoke the API calls 924 provided by the mobile operating system such as operating system 914 to facilitate functionality described herein.

The applications 920 may utilize built-in operating system functions (e.g., kernel 928, services 930 and/or drivers 932), libraries (e.g., system libraries 934, API libraries 936, and other libraries 938), frameworks/middleware 918 to create user interfaces to interact with users of the system. Alternatively, or additionally, in some systems, interactions with a user may occur through a presentation layer, such as presentation layer 944. In these systems, the application/module "logic" can be separated from the aspects of the application/module that interact with a user.

Some software architectures utilize virtual machines. In the example of FIG. 9, this is illustrated by virtual machine 948. A virtual machine creates a software environment where applications/modules can execute as if they were executing on a hardware computing device. A virtual machine is hosted by a host operating system (operating system 914) and typically, although not always, has a virtual machine monitor 946, which manages the operation of the virtual machine 948 as well as the interface with the host operating system (i.e., operating system 914). A software architecture executes within the virtual machine 948 such as an operating system 950, libraries 952, frameworks/middleware 954, applications 956 and/or presentation layer 958. These layers of software architecture executing within the virtual machine 948 can be the same as corresponding layers previously described or may be different.

Modules, Components and Logic

A computer system may include logic, components, modules, mechanisms, or any suitable combination thereof. Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. One or more computer systems (e.g., a standalone, client, or server computer system) or one or more hardware processors may be configured by software (e.g., an application or application portion) as a hardware-implemented module that operates to perform certain operations as described herein.

A hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or another programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired), or temporarily or transitorily configured (e.g., programmed) to operate in a certain manner and/or to perform certain operations described herein. Hardware-implemented modules may be temporarily configured (e.g., programmed), and each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses that connect the hardware-implemented modules). Multiple hardware-implemented modules are configured or instantiated at different times. Communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. The processor or processors may be located in a single location (e.g., within a home environment, an office environment, or a server farm), or the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., APIs).

Electronic Apparatus and System

The systems and methods described herein may be implemented using digital electronic circuitry, computer hardware, firmware, software, a computer program product (e.g., a computer program tangibly embodied in an information carrier, e.g., in a machine-readable medium for execution by, or to control the operation of, data processing apparatus, e.g., a programmable processor, a computer, or multiple computers), or any suitable combination thereof.

A computer program can be written in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site or distributed across multiple sites (e.g., cloud computing) and interconnected by a communication network. In cloud computing, the server-side functionality may be distributed across multiple computers connected by a network. Load balancers are used to distribute work between the multiple computers. Thus, a cloud computing environment performing a method is a system comprising the multiple processors of the multiple computers tasked with performing the operations of the method.

Operations may be performed by one or more programmable processors executing a computer program to perform functions by operating on input data and generating output. Method operations can also be performed by, and apparatus of systems may be implemented as, special purpose logic circuitry, e.g., an FPGA or an ASIC.

The computing system can include clients and servers. A client and server are generally remote from each other and typically interact through a communication network. The relationship of client and server arises by virtue of computer programs running on the respective computers and having a client-server relationship to each other. A programmable computing system may be deployed using hardware architecture, software architecture, or both. Specifically, it will be appreciated that the choice of whether to implement certain functionality in permanently configured hardware (e.g., an ASIC), in temporarily configured hardware (e.g., a combination of software and a programmable processor), or in a combination of permanently and temporarily configured hardware may be a design choice. Below are set out example hardware (e.g., machine) and software architectures that may be deployed.

Example Machine Architecture and Machine-Readable Medium

Figure 10:
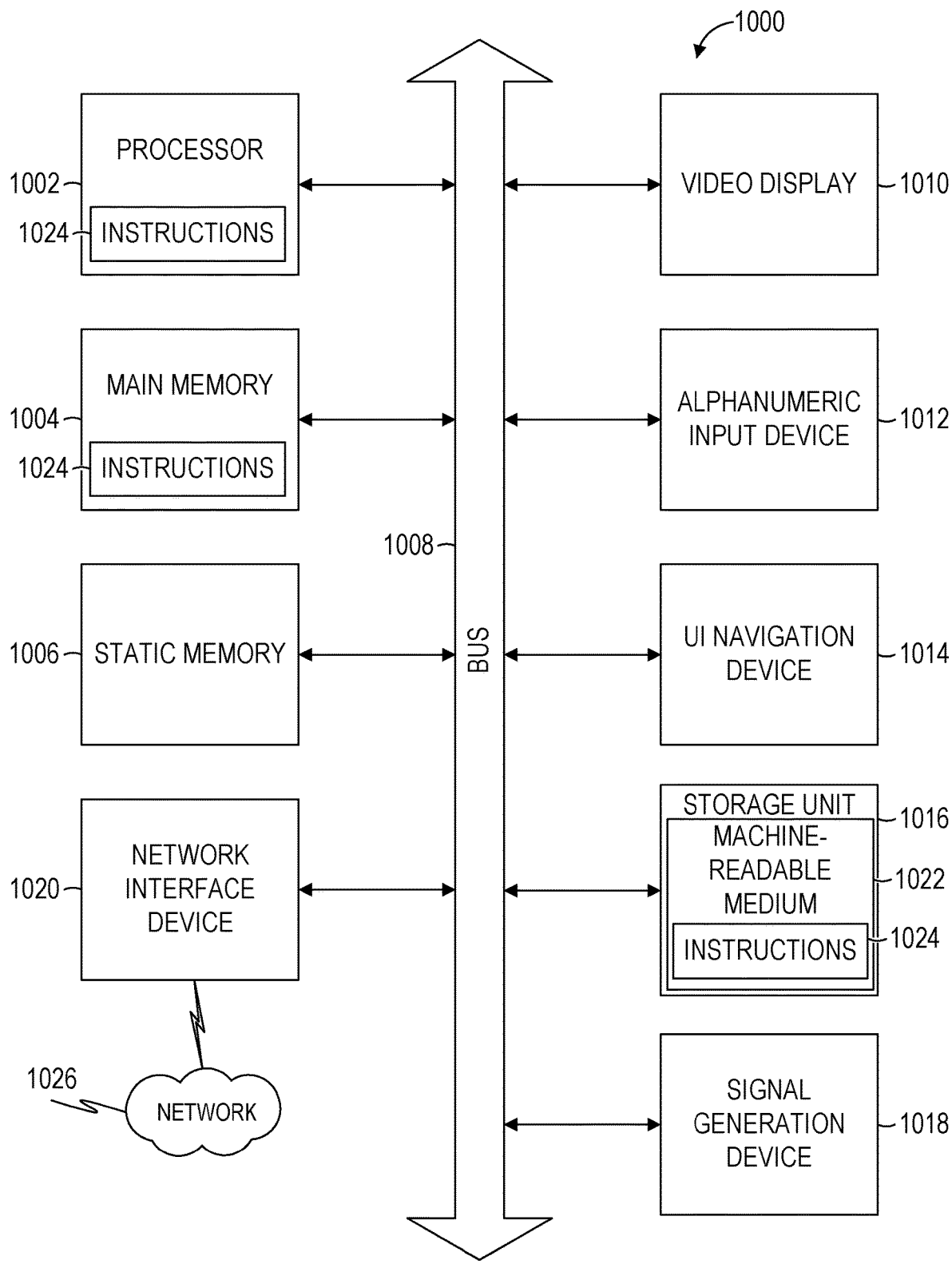
FIG. 10 is a block diagram of a machine in the example form of a computer system within which instructions may be executed for causing the machine to perform any one or more of the methodologies discussed herein.

FIG. 10 is a block diagram of a machine in the example form of a computer system 1000 within which instructions 1024 may be executed for causing the machine to perform any one or more of the methodologies discussed herein. The machine may operate as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a personal digital assistant (PDA), a cellular telephone, a web appliance, a network router, switch, or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1000 includes a processor 1002 (e.g., a central processing unit (CPU), a graphics processing unit (GPU), or both), a main memory 1004, and a static memory 1006, which communicate with each other via a bus 1008. The computer system 1000 may further include a video display unit 1010 (e.g., a liquid crystal display (LCD) or a cathode ray tube (CRT)). The computer system 1000 also includes an alphanumeric input device 1012 (e.g., a keyboard or a touch-sensitive display screen), a user interface (UI) navigation (or cursor control) device 1014 (e.g., a mouse), a storage unit 1016, a signal generation device 1018 (e.g., a speaker), and a network interface device 1020.

Machine-Readable Medium

The storage unit 1016 includes a machine-readable medium 1022 on which is stored one or more sets of data structures and instructions 1024 (e.g., software) embodying or utilized by any one or more of the methodologies or functions described herein. The instructions 1024 may also reside, completely or at least partially, within the main memory 1004 and/or within the processor 1002 during execution thereof by the computer system 1000, with the main memory 1004 and the processor 1002 also constituting machine-readable media 1022.

While the machine-readable medium 1022 is shown in FIG. 10 to be a single medium, the term "machine-readable medium" may include a single medium or multiple media (e.g., a centralized or distributed database, and/or associated caches and servers) that store the one or more instructions 1024 or data structures. The term "machine-readable medium" shall also be taken to include any tangible medium that is capable of storing, encoding, or carrying instructions 1024 for execution by the machine and that cause the machine to perform any one or more of the methodologies of the present disclosure, or that is capable of storing, encoding, or carrying data structures utilized by or associated with such instructions 1024. The term "machine-readable medium" shall accordingly be taken to include, but not be limited to, solid-state memories, and optical and magnetic media. Specific examples of machine-readable media 1022 include non-volatile memory, including by way of example semiconductor memory devices, e.g., erasable programmable read-only memory (EPROM), electrically erasable programmable read-only memory (EEPROM), and flash memory devices; magnetic disks such as internal hard disks and removable disks; magneto-optical disks; and compact disc read-only memory (CD-ROM) and digital versatile disc read-only memory (DVD-ROM) disks. A machine-readable medium is not a transmission medium.

Transmission Medium

The instructions 1024 may further be transmitted or received over a communications network 1026 using a transmission medium. The instructions 1024 may be transmitted using the network interface device 1020 and any one of a number of well-known transfer protocols (e.g., hypertext transport protocol (HTTP)). Examples of communication networks include a local area network (LAN), a wide area network (WAN), the Internet, mobile telephone networks, plain old telephone (POTS) networks, and wireless data networks (e.g., WiFi and WiMax networks). The term "transmission medium" shall be taken to include any intangible medium that is capable of storing, encoding, or carrying instructions 1024 for execution by the machine, and includes digital or analog communications signals or other intangible media to facilitate communication of such software.

Although specific examples are described herein, it will be evident that various modifications and changes may be made to these examples without departing from the broader spirit and scope of the disclosure. Accordingly, the specification and drawings are to be regarded in an illustrative rather than a restrictive sense. The accompanying drawings that form a part hereof show by way of illustration, and not of limitation, specific examples in which the subject matter may be practiced. The examples illustrated are described in sufficient detail to enable those skilled in the art to practice the teachings disclosed herein.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" and "an" are herein used, as is common in patent documents, to include one or more than one instance. Finally, as used herein, the conjunction "or" refers to a non-exclusive "or," unless specifically stated otherwise.

What is claimed is:

1. A method comprising:
    training a first machine learning model to detect sentiment in communications by providing a training set comprising a plurality of data objects, each data object of the plurality of data objects comprising of one or more embedding vectors and a sentiment of interactions represented by the one or more embedding vectors;
    accessing, by one or more processors via a network and from a first server, first text for a first interaction between a first individual of a first organization and a second organization, the first interaction comprising at least one communication from the first organization and at least one communication from the second organization, the first interaction using a first channel;
    accessing, by the one or more processors via the network and from a second server, second text for a second interaction between a second individual of the first organization and the second organization, the second interaction comprising at least one communication from the first organization and at least one communication from the second organization, the second interaction using a second channel different from the first channel;

converting the first text to first vector data in a vector format;

converting the second text to second vector data in the vector format;

receiving, from the first machine learning model, sentiment data based on the first vector data and the second vector data;

receiving, from a second machine learning model, summary data based on the first vector data and the second vector data;

receiving, from a third machine learning model, recommendation data based on the summary data, the recommendation data identifying a channel and either the first individual or the second individual; and in response to detecting a user interaction with a button of a first user interface presented at a client device of a representative of the second organization, causing a second user interface to be presented at the client device, the second user interface including at least a portion of the summary data and at least a portion of the sentiment data, the second user interface comprising an identifier of the channel and the identified individual.

2. The method of claim 1, further comprising:
accessing audio for the second interaction; and
generating the second text using speech-to-text conversion of the audio.

3. The method of claim 1, wherein the summary data includes a first summary for communications from the first organization and a second summary for communications from the second organization.

4. The method of claim 1, wherein the summary data includes a first summary for communications of the first individual and a second summary for communications of the second individual of the first organization.

5. The method of claim 1, further comprising:
receiving, from a fourth machine learning model, topic data based on the summary data;
wherein the second user interface includes at least a portion of the topic data.

6. The method of claim 1, further comprising receiving, via the first user interface, a selection of the first organization, wherein the causing of the second user interface to be presented with the summary data related to the first organization is based on the receiving of the selection of the first organization.

7. The method of claim 6, wherein the accessing of the first text and the accessing of the second text are based on the receiving of the selection of the first organization.

8. A system comprising:
one or more hardware processors;
a memory that stores instructions that, when executed by the one or more hardware processors, cause the one or more hardware processors to perform operations comprising:
training a first machine learning model to detect sentiment in communications by providing a training set comprising a plurality of data objects, each data object of the plurality of data objects comprising of one or more embedding vectors and a sentiment of interactions represented by the one or more embedding vectors;

accessing, via a network and from a first server, first text for a first interaction between a first individual of a first organization and a second organization, the first interaction comprising at least one communication from the first organization and at least one communication from the second organization, the first interaction using a first channel;

accessing, via the network and from a second server, second text for a second interaction between a second individual of the first organization and the second organization, the second interaction comprising at least one communication from the first organization and at least one communication from the second organization, the second interaction using a second channel different from the first channel;

converting the first text to first vector data in a vector format;

converting the second text to second vector data in the vector format;

receiving, from the first machine learning model, sentiment data based on the first vector data and the second vector data;

receiving, from a second machine learning model, summary data based on the first vector data and the second vector data;

receiving, from a third machine learning model, recommendation data based on the summary data, the recommendation data identifying a channel and either the first individual or the second individual; and in response to detecting a user interaction with a button of a first user interface presented at a client device of a representative of the second organization, causing a second user interface to be presented at the client device, the second user interface including at least a portion of the summary data and at least a portion of the sentiment data, the second user interface comprising an identifier of the channel and the identified individual.

9. The system of claim 8, wherein the operations further comprise:
accessing audio for the second interaction; and
generating the second text using speech-to-text conversion of the audio.

10. The system of claim 8, wherein the summary data includes a first summary for communications from the first organization and a second summary for communications from the second organization.

11. The system of claim 8, wherein the summary data includes a first summary for communications of the first individual and a second summary for communications of the second individual of the first organization.

12. The system of claim 8, wherein the operations further comprise: receiving, via the first user interface, a selection of the first organization, wherein the causing of the second user interface to be presented with the summary data related to the first organization is based on the receiving of the selection of the first organization.

13. The system of claim 12, wherein the accessing of the first text and the accessing of the second text are based on the receiving of the selection of the first organization.

14. A non-transitory computer-readable medium that stores instructions that, when executed by one or more processors, cause the one or more processors to perform operations comprising:
training a first machine learning model to detect sentiment in communications by providing a training set comprising a plurality of data objects, each data object of the plurality of data objects comprising of one or more embedding vectors and a sentiment of interactions represented by the one or more embedding vectors;
accessing, via a network and from a first server, first text for a first interaction between a first individual of a first organization and a second organization, the first interaction comprising at least one communication from the first organization and at least one communication from the second organization, the first interaction using a first channel;
accessing, via the network and from a second server, second text for a second interaction between a second individual of the first organization and the second organization, the second interaction comprising at least one communication from the first organization and at least one communication from the second organization, the second interaction using a second channel different from the first channel;
converting the first text to first vector data in a vector format;
converting the second text to second vector data in the vector format;
receiving, from the first machine learning model, sentiment data based on the first vector data and the second vector data;
receiving, from a second machine learning model, summary data based on the first vector data and the second vector data;
receiving, from a third machine learning model, recommendation data based on the summary data, the recommendation data identifying a channel and either the first individual or the second individual; and
in response to detecting a user interaction with a button of a first user interface presented at a client device of a representative of the second organization, causing a second user interface to be presented at the client device, the second user interface including at least a portion of the summary data and at least a portion of the sentiment data, the second user interface comprising an identifier of the channel and the identified individual.

15. The non-transitory computer-readable medium of claim 14, wherein the operations further comprise:
accessing audio for the second interaction; and
generating the second text using speech-to-text conversion of the audio.

16. The non-transitory computer-readable medium of claim 14, wherein the summary data includes a first summary for communications from the first organization and a second summary for communications from the second organization.

17. The non-transitory computer-readable medium of claim 14, wherein the summary data includes a first summary for communications of the first individual and a second summary for communications of the second individual of the first organization.

18. The non-transitory computer-readable medium of claim 14, wherein the operations further comprise:
receiving, from a fourth machine learning model, topic data based on the summary data;
wherein the second user interface includes at least a portion of the topic data.

19. The non-transitory computer-readable medium of claim 14, wherein the operations further comprise: receiving, via the first user interface, a selection of the first organization, wherein the causing of the second user interface to be presented with the summary data related to the first organization is based on the receiving of the selection of the first organization.

20. The non-transitory computer-readable medium of claim 19, wherein the accessing of the first text and the accessing of the second text are based on the receiving of the selection of the first organization.

* * * * *